(12) United States Patent
Komiya et al.

(10) Patent No.: US 9,292,934 B2
(45) Date of Patent: Mar. 22, 2016

(54) IMAGE PROCESSING DEVICE

(71) Applicant: Hitachi Kokusai Electric Inc., Tokyo (JP)

(72) Inventors: Yuichiro Komiya, Tokyo (JP); Haruhiro Koto, Tokyo (JP); Muneaki Yamaguchi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/429,051

(22) PCT Filed: Sep. 9, 2013

(86) PCT No.: PCT/JP2013/074245
§ 371 (c)(1),
(2) Date: Mar. 18, 2015

(87) PCT Pub. No.: WO2014/069103
PCT Pub. Date: May 8, 2014

(65) Prior Publication Data
US 2015/0228085 A1    Aug. 13, 2015

(30) Foreign Application Priority Data

Oct. 29, 2012    (JP) .................................. 2012-237963

(51) Int. Cl.
*G06K 9/00*    (2006.01)
*G06T 7/20*    (2006.01)
*H04N 5/232*    (2006.01)
*G06T 5/00*    (2006.01)

(52) U.S. Cl.
CPC . *G06T 7/20* (2013.01); *G06T 5/002* (2013.01); *H04N 5/23267* (2013.01); *G06T 2207/20016* (2013.01); *G06T 2207/30232* (2013.01)

(58) Field of Classification Search
None
See application file for complete search history.

(56) References Cited

U.S. PATENT DOCUMENTS 7,020,351 B1 *    3/2006    Kumar ............. G06F 17/30793
                                           379/93.25
2008/0107307 A1 *    5/2008    Altherr ............... G06T 7/2006
                                           382/107

(Continued)

FOREIGN PATENT DOCUMENTS

JP    2011229030 A    11/2011
JP    2012160886 A1    8/2012

(Continued)

OTHER PUBLICATIONS

International Search Report for PCT/JP2013/074245 mailed Dec. 10, 2013.

*Primary Examiner* — Weiwen Yang
(74) *Attorney, Agent, or Firm* — Brundidge & Stanger, P.C.

(57) ABSTRACT

Disclosed is a method for correcting for shimmer due to thermal turbulence, even for moving subjects, on a time smoothed base. The device is provided with: a movement compensation means that, for a correction-targeted block of a correction-targeted image within an input image, uses a temporally proximate correction image to derive movement information about a moving object, performs motion compensation, and outputs a correction block and a cost value; and a shimmer correction means that carries out time averaging processing, in accordance with the cost value, of the correction-targeted block and the correction block, and outputs a corrected block in which shimmer of the moving object has been corrected, and correction information. Through two-stage motion detection, the movement compensation means extracts and compensates for movement of a moving object, in a manner unaffected by thermal turbulence.

8 Claims, 4 Drawing Sheets

(56) References Cited

U.S. PATENT DOCUMENTS

2010/0053346 A1* 3/2010 Mitsunaga ......... H04N 5/23248 348/208.6
2012/0194685 A1 8/2012 Kawakami et al.

FOREIGN PATENT DOCUMENTS

JP 2012182625 A 9/2012
WO 2012/063533 A1 5/2012

* cited by examiner

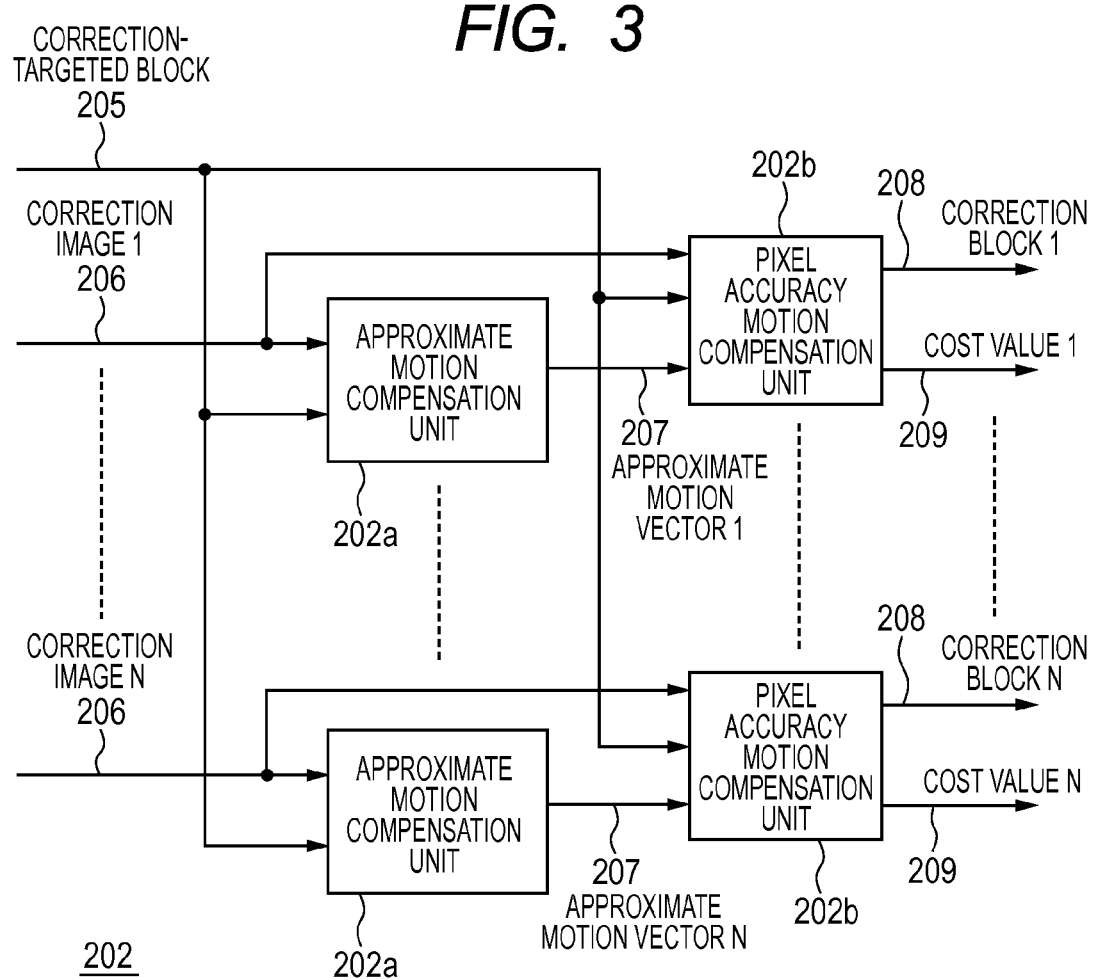
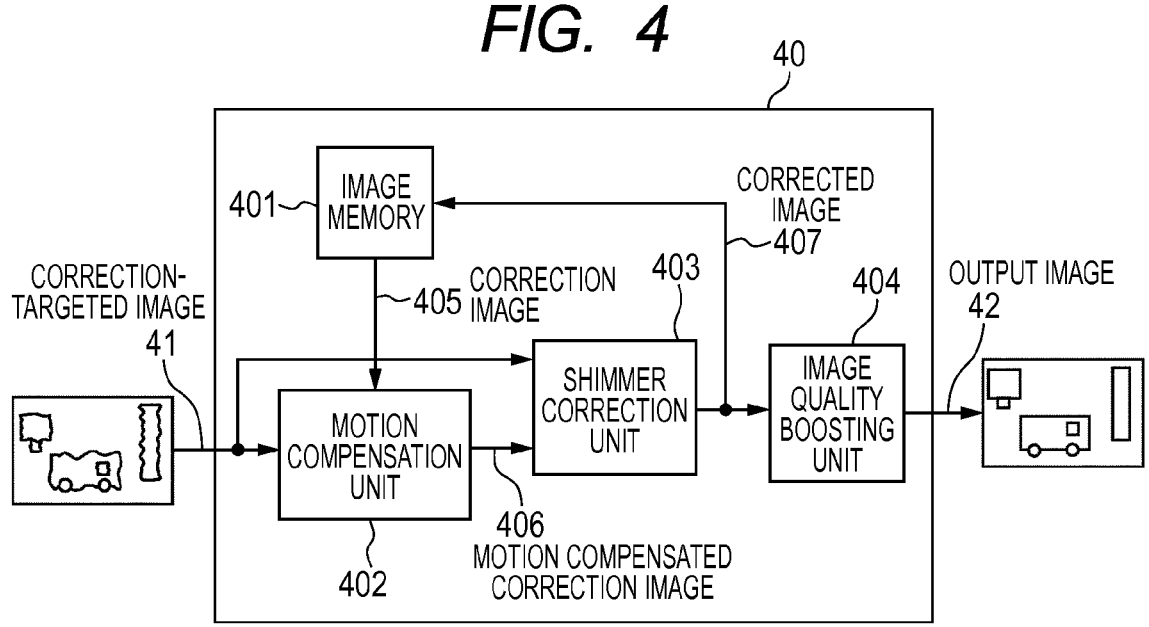

IMAGE PROCESSING DEVICE

TECHNICAL FIELD

The present invention relates to an image processing device. More particularly, the invention relates to an image processing device capable of lessening the image degradation owing to shimmer of the image, for example, heat haze.

BACKGROUND ART

Shimmer correction is one of image correction approaches used for a surveillance camera system. The "shimmer" in this case refers to the phenomenon of local shimmer of the image owing to fluctuation in the refractive index inside the optical path, which is caused by the thermal turbulence and the like. This phenomenon is referred to as the heat haze, causing deterioration in visibility. Correction of the shimmer may improve visibility.

Several kinds of techniques for correcting the shimmer in the image have been proposed. As one of the aforementioned techniques, correction of the deformed image caused by the shimmer, which is acquired in the form of the motion vector has been proposed. This technique, however, requires the local shimmer by pixel, causing the problem of a significantly large computation amount.

There has been proposed the technique of alleviating the influence of shimmer by smoothing the time-series image (video image) in a direction of time (see, for example, Patent Literature 1 and Non-Patent Literature 1). The shimmer may irregularly displace the pixel position depending on time. The displacement is in a manner of normal distribution with respect to the center point. Therefore, a plurality of pixels at different time points are simply overlapped with one another for smoothing so as to alleviate the influence of the shimmer, providing the original configuration of the subject.

Correction of the shimmer through time smoothing is highly effective for the immobile subject. However, in the case where the moving object exists in the image, the after-image will be left in the region through which the moving object has passed, resulting in a smeared outline.

FIG. 5 schematically shows a generally employed shimmer correction technique through the time smoothing process. Codes 171, 172, 173 in the time-series input images 11, 12, 13 denote images of a subject (tree) 17, which are influenced by shimmer. Codes 181, 182, 183 in the input images 11, 12, 13 denote images of a subject (pillar) 18, which are influenced by shimmer. Codes 191, 192, 193 in the input images 11, 12, 13 denote images of a subject (vehicle) 19, which are influenced by shimmer. In the case where the input images 11, 12, 13 are under the influence of shimmer, visibility of the subject image is deteriorated.

In order to alleviate the influence, an attempt of time smoothing pixel values of a plurality of temporally proximate frames has been made. An image 54 denotes the one corrected by time smoothing. A section 554 in the image 54 denotes the corrected image of the subject (tree) 17. A section 564 in the image 54 denotes the corrected image of the subject (pillar) 18. In this case, the correction is effective for the static subjects 17, 18 in the image 54 corrected through time averaging. In a region 58 where the moving object 19 has existed, smear owing to motion blur is observed, which may deteriorate the image quality. The time smoothing process will be defined as filtering executed in the region including a plurality of pixels in time direction through the uniform method. In this case, the term "uniform" means that the shimmer is not considered at the pixel level. Accordingly, the "uniform" applies to the smoothing process which involves affine transformation (to be described later) evenly performed over the region in accordance with deformation of the moving body.

Meanwhile, the applicant of the present invention filed the application, Patent Application No. 2012-107470 (which will be referred to as earlier application) describing the technique that suppresses smear of the image by calculating similarity between the correction-targeted image and the time smoothed image, and accurately recognizing the region of the moving body for outputting without executing the time smoothing process. The technology relevant to the present invention has been filed with Patent Application No. 2013-57774 (which will be referred to as related invention).

CITATION LIST

Patent Literature

PTL 1: JP-A-2007-49269
PTL 2: JP-A-2012-104018
Non-Patent Literature 1: Leonid P. Yaroslaysky et al., "Processing and Fusion of Thermal and Video Sequence for Terrestrial Long Range Observation Systems", 2004, Website <URL: http://www.fusion2004.foi.se/papers/IF04-0848.pdf>

SUMMARY OF INVENTION

Problem to be Solved by the Invention

As described above, it is difficult for prior art to impart the shimmer correction effect to the moving object image through smoothing in the time direction. It is fundamentally difficult to extract the moving object from the shimmering image in spite of the motion compensation applied to the moving object image. It is also difficult to correct only the shimmering motion separated from the motion resulting from movement of the subject. Artifact may occur unless the aforementioned process is accurately executed. According to Non-Patent Literature 1, a part with large difference between the original image and the entirely shimmer corrected image (basically, corresponding to the whole moving object), the corrected image is regarded as being a failure. Then the image is restored into the original image.

Based on the aforementioned circumstance, it is an object of the present invention to provide an image processing device capable of imparting the shimmer correction effect even to the moving subject.

Means for Solution

The image processing device according to the present invention corrects a shimmer of an input image, and includes a motion compensation unit configured to acquire motion information of a moving object using a correction image temporally proximate to a correction-targeted image in the input image to output a motion compensated correction image, and a shimmer correction unit configured to execute a time smoothing process using the correction-targeted image and the motion compensated correction image to output a corrected image with corrected shimmer of the moving object. The motion compensation unit may be configured to include an approximate motion compensation unit for acquiring approximate motion information by aligning the correction-targeted image and the correction image, both of which have been reduced, and a pixel accuracy motion compensation unit for executing the motion compensation with pixel accuracy using the correction-targeted image and the correction image, while taking the approximate motion information as an initial value.

The image processing device according to the present invention includes a storage unit for storing the correction image output from the shimmer correction unit. The motion compensation unit may be configured to acquire the motion information of the moving object using the correction image output from the storage unit as the correction image to output the motion compensated correction image.

Advantageous Effects of Invention

The present invention is capable of imparting the shimmer suppression effect to the moving subject through time smoothing.

BRIEF DESCRIPTION OF DRAWINGS

FIG. 3 is an internal block diagram of a motion compensation unit 20 of the image processing device according to the first embodiment.

FIG. 4 is a block diagram of an image processing device according to a second embodiment of the present invention.

Figure 1:
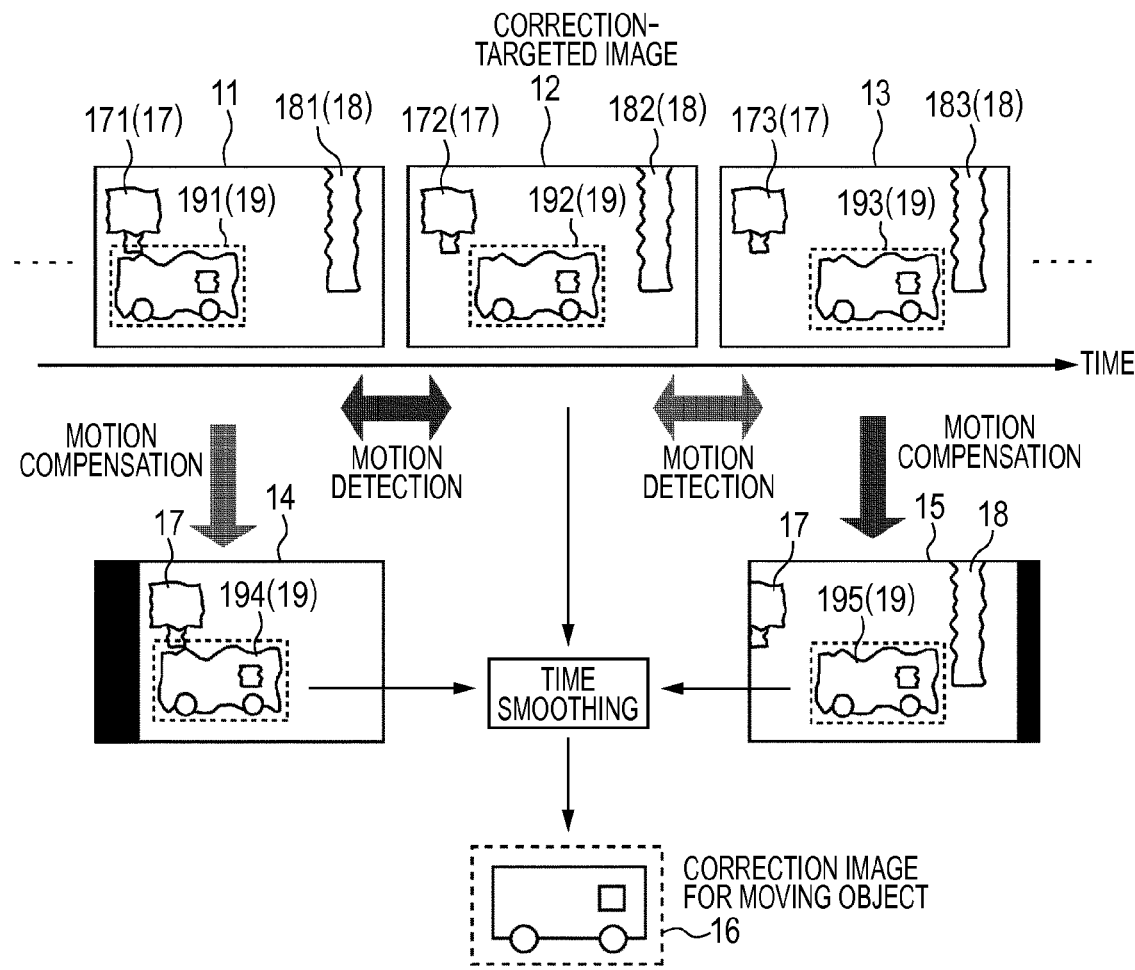
FIG. 1 is a schematic view representing shimmer correction to a moving object through time averaging.

MODE FOR CARRYING OUT THE INVENTION (Outline of Shimmer Correction According to the Present Invention)

The shimmer correction according to the present invention will be summarized referring to the drawings.

FIG. 1 is an explanatory view schematically representing the shimmer correction to the moving object through time averaging.

Input images 11, 12, 13 are time-series images input from an image pickup device, for example, the surveillance camera. Sections 171, 172, 173 in the input images 11, 12, 13 denote images of a subject (tree) 17, which are influenced by shimmer. Sections 181, 182, 183 in the input images 11, 12, 13 are images of a subject (pillar) 18, which are influenced by shimmer. Sections 191, 192, 193 in the input images 11, 12, 13 are images of a subject (traveling vehicle) 19, which are influenced by shimmer. This embodiment will be described on the assumption that the time interval between the respective input images 11 to 13 is short to allow detection of change in the moving object or change in the shimmer owing to heat haze upon shimmer correction.

The input image 12, for example, selected from those images 11, 12, 13, is set to a correction-targeted image 12. In order to correct shimmer of the moving object such as the traveling vehicle, it is necessary to use the pixel value of the moving object that exists in the temporally proximate image to the correction-targeted image 12. For this, the motion information of the moving object is acquired through the motion detection from the correction-targeted image 12 and the preceding input image 11 to execute the motion compensation. An image 14 represents that the input image 11 as a whole is moved (that is, motion compensated) using the motion information for the purpose of easily presenting the motion compensation. Likewise, the motion information of the moving object is acquired from the correction-targeted image 12 and the subsequent input image 13 through the motion detection. An image 15 represents an example that the input image 13 has been subjected to the motion compensation. Sections 194, 195 in the images 14, 15 denote images of the motion compensated subject 19. Those images 194, 195 are used to execute the time smoothing to acquire the corrected image 16 of the moving object 19.

This allows shimmer correction to the moving object 19, thus providing the corrected image 16 of the moving object.

The "time smoothing" will be defined as filtering in the time direction through the uniform method in the region including a plurality of pixels. The term "uniform" represents that the shimmer is not considered at the pixel level. Therefore, the "uniform" applies to the smoothing that involves the affine transformation (to be described later) expected uniformly in the region in accordance with deformation of the moving object.

First Embodiment

Figure 2:
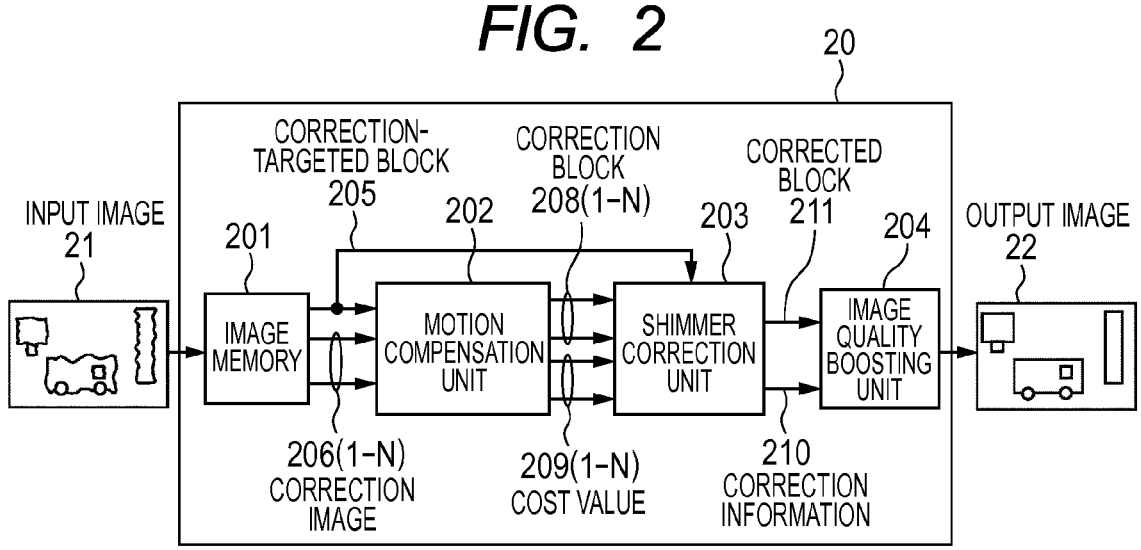
FIG. 2 is a block diagram of an image processing device according to a first embodiment of the present invention.
Figure 5:
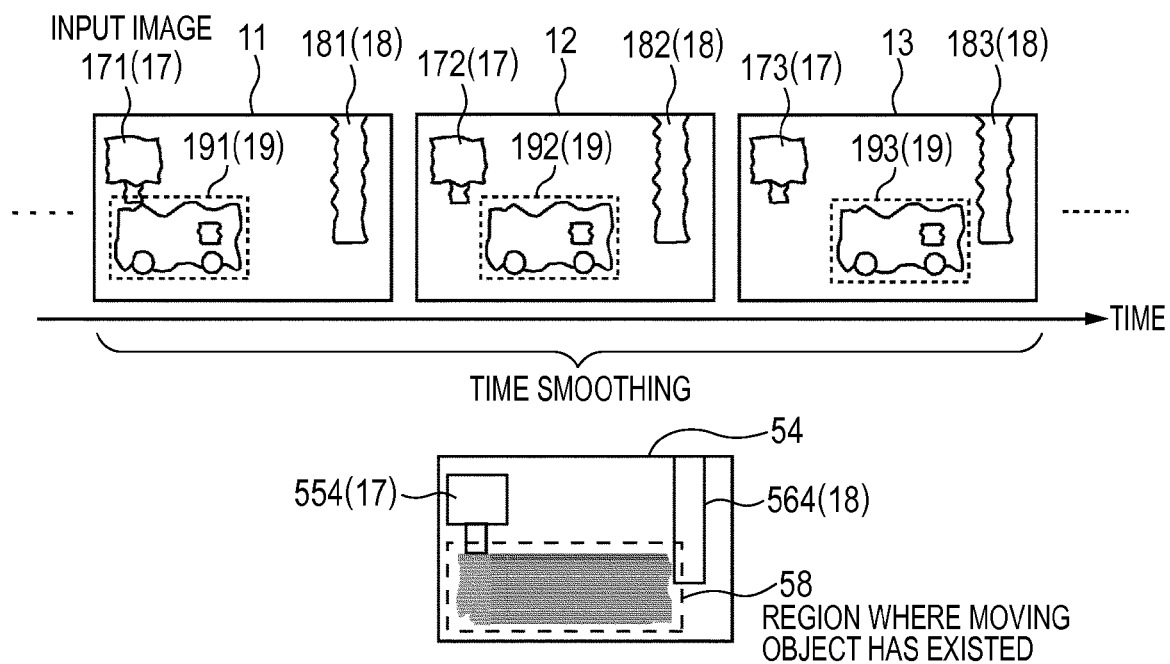
FIG. 5 is a schematic view representing the shimmer correction through time smoothing process according to the prior art.

FIG. 2 shows an image processing device 20 according to a first embodiment. In this embodiment, the image is divided into blocks in matrix, each with predetermined size, and each block as a unit is subjected to the shimmer correction process. The image processing device 20 in this embodiment includes an image memory 201, a motion compensation unit 202, a shimmer correction unit 203, and an image quality boosting unit 204. The image processing device 20 includes a microcomputer (not shown) which operates various types of calculations by executing the program stored in the memory for the purpose of realizing the respective functions as described below.

The image memory 201 retains at least (N+1) pieces (N: natural number) of input images 21 which have been input. One of those images is set as the correction-targeted image, and one block (corresponding to a part of the section 192) in the correction-targeted image is output as a correction targeted block 205. The N pieces of images which are temporally proximate to the correction-targeted block 205 are output as correction images 206 (206-1 to 206-N). For example, 16×16 or 32×32 pixels may be used as the block size which is set to be larger than the shimmer width. The correction-targeted block 205 will be sequentially extracted from the correction-targeted image through raster scanning.

The motion compensation unit 202 receives inputs of the correction-targeted block 205 and the correction images 206 (1 to N), and outputs correction blocks 208 (1 to N) each as the block (corresponding to the subject images 191, 192) through which the subject has passed among the correction images 206 (1 to N), and cost values 209 (1 to N) each indicating similarity to the correction-targeted block 205 for each of the correction blocks 208 (1 to N).

The shimmer correction unit 203 receives inputs of the correction-targeted block 205, the correction blocks 208 (1 to N), and the cost values 209 (1 to N), and outputs a corrected block 211 and correction information 210 indicating the correction strength.

The image quality boosting unit 204 receives inputs of the corrected image 211 and the correction information 210, and outputs on an output image 22.

The process executed by the respective blocks will be described in detail.

The image memory 201 passes data of the correction images 206 (1 to N) in the range required for searching the parameter as described below to the motion compensation unit 202 until the process of the correction-targeted block 205 is executed by the motion compensation unit 202.

The motion compensation unit 202 receives inputs of the correction-targeted block 205 and the correction images 206 (1 to N), and searches the part similar to the correction-targeted block 205 from the respective correction images 206 (1 to N). The searched similar part is extracted and output as the correction block 208 (1 to N). At this time, the motion compensation unit 202 distinguishes between the movement caused by shimmer and the movement of the subject so that the correction block 208 is output only if the motion caused by the subject movement is detected. For this, the motion compensation unit 202 according to the embodiment may be configured as shown in FIG. 3.

Referring to an embodiment shown in FIG. 3, the motion compensation unit 202 includes N approximate motion compensation units 202a and N pixel accuracy motion compensation units 202b.

The approximate motion compensation unit 202a obtains the motion information with coarse accuracy corresponding to the shimmer width or larger. The approximate motion compensation unit 202a aligns the correction-targeted block 205 and the correction images 206 (1 to N), both of which have been reduced through the low-pass filter. The alignment performed after reducing the image allows lessening of the influence of shimmer and decrease in the computation amount for search.

The alignment may be performed by defining the cost value expressed by the evaluation function as indicated by a (formula 1), and searching the parameter ($\Delta x'$,$\Delta y'$) for minimizing the value through the gradient method.

$$C_{coarse}(\Delta x' \Delta y') = \sum_{i=1}^{M'} \sum_{j=1}^{M'} |b_{obj\_red}(i, j) - p_{n\_red}(i + x'_{obj} + \Delta x', j + y'_{obj} + \Delta y')| \quad \text{(formula 1)}$$

The code $b_{obj\_red}(i,j)$ denotes the pixel value of the reduced correction-targeted block 205 at coordinates (i,j), and the code M' denotes the reduced block size. The code $p_{\_n\_red}$ (x',y') denotes the pixel value of the nth correction image 206-n at coordinates (x',y') (n:1 to N) among the reduced correction images 206 (1 to N). The coordinates ($x'_{obj}$, $y'_{obj}$) are those of the correction-targeted block in the case where the correction-targeted image is reduced. The approximate motion information detection unit 202a outputs the ($\Delta x'$,$\Delta y'$) corresponding to the minimum point of the cost value as the coarse motion information (motion vector) 207-n. This search gives priority to smallness in processing amount over accuracy by reusing a part of the preceding calculation for search or reducing the conditional branch. It is possible to apply Kalman filter to the approximate motion information data 207-1 to 207-N before passing such information to the pixel accuracy motion compensation unit 202b for smooth motion.

Each of the pixel accuracy motion compensation units 202b receives inputs of the correction-targeted block 205, the corresponding correction image 206(n), and the corresponding coarse motion vector 207(n), and outputs the correction block 208(n).

The pixel accuracy motion compensation unit 202b of this embodiment executes the motion compensation using a histogram which suffers little influence of change in the object configuration. The partial image (the same size as the block) in the correction image 206(n) with the histogram that has the closest shape to that of the correction-targeted block 205 is set to the correction block 208(n). This allows the motion compensation unit 202 to distinguish between the movement caused by shimmer and the movement of the subject to ensure output of the correction block 208(n) having only the subject movement corrected.

The method of searching the parameter according to the embodiment will be described. In this embodiment, the cost function as expressed by a (formula 2) is defined.

$$C_{fine}(\Delta x, \Delta y) = \sum_{k=1}^{K} |h_{obj}(k) - h_n(k, \Delta x, \Delta y)| \quad \text{(formula 2)}$$

The code $h_{obj}(k)$ denotes the histogram of the correction-targeted block 205, and k denotes an index of a bin of the histogram. The code $h_n(k,\Delta x,\Delta y)$ denotes the value of the kth bin of the histogram in the block of the correction image 206(n) at coordinates ($\Delta x,\Delta y$). The parameter search is executed through the gradient method by setting the cost value derived from the (formula 2) to the evaluation function. At this time, the initial value of ($\Delta x,\Delta y$) is obtained using the motion vector derived from output of the approximate motion compensation unit 202a.

The pixel accuracy motion compensation unit 202b sets the block obtained when the cost function value is minimized to the correction block 208(n), which will be output together with a cost value $C_{fine}$ 209 as the value of the cost function.

The explanation will be further made referring to FIG. 2 again.

The shimmer correction unit 203 executes the shimmer correction process by smoothing the correction-targeted block 205 with the correction block 208 (1 to N) in accordance with the cost value 209 (1 to N). The cost value 209 is considered upon time smoothing in order to suppress degradation in the image quality after correction in the case where the subject corresponding to the one of the correction-targeted block does not originally exist in the correction image, and the motion compensation cannot be appropriately converged. The smoothing process may be executed as expressed by a (formula 3).

$$b_{cor}(i, j) = \frac{b_{obj}(i, j) + \sum_{n=1}^{N} \alpha_n \cdot b_n(i, j)}{1 - \sum_{n=1}^{N} \alpha_n} \quad \text{(formula 3)}$$

The code $b_{cor}(i,j)$ denotes the pixel value of the corrected block 211 at coordinates (i,j), $b_{obj}(i,j)$ denotes the pixel value of the correction-targeted block 205 at coordinates (i,j), and $b_n(i,j)$ denotes the pixel value of the correction block 208(n) at coordinates (i,j). The code alpha, denotes a coefficient (weight) for time smoothing, which is determined based on the cost value $C_n$. Assuming that the $C_n$ is the value which is increased as reliability of the correction block becomes higher, the following relationship may be determined as expressed by a (formula 4) using two threshold values $T_1$, $T_2$($T_1$<$T_2$), for example.

$$\alpha_n = \begin{cases} 0 & \ldots & (C_n < T_1) \\ (C_n - T_1)/(T_2 - T_1) & \ldots & (T_1 \le C_n < T_2) \\ 1 & \ldots & (T_2 < C_n) \end{cases} \quad \text{(formula 4)}$$

The code $C_n$ may be set to the value $-C_{fine}$, for example.

The shimmer correction unit 203 outputs the corrected block 211 derived from the (formula 3) and the correction information 210 indicating the correction strength. For example, the total value of alpha$_1$ to alpha$_N$ derived from the (formula 4), and the number of non-zero values of alpha$_n$ may be used as the correction information.

The image quality boosting unit 204 receives inputs of the corrected block 211 and the correction information 210, and pastes the corrected block 211 to reconstruct the image within the same visual field as the input image 21. The image quality boosting process is further executed in accordance with the correction information 210 for each block so as to output the output image 22. For example, edge enhancement filter may be used for the image quality boosting process. The use of the edge enhancement filter ensures to provide the resolution, which has been lost by smoothing. However, if the edge enhancement is applied to the image that is not sufficiently smoothed, the resultant image becomes unnatural. This problem may be avoided by setting the appropriate threshold value, and executing the process that the edge enhancement filter is applied to the correction information equal to or larger than the threshold value, and is not applied to the one smaller than the threshold value. Alternatively, it may be avoided by switching the process (the edge enhancement degree), for example. If the same filter is applied over a plurality of corrected blocks, it is preferable to sequentially execute the respective processes (reference is made to the pixel value of the adjacent corrected block in order to obtain the pixel value around the boundary of the corrected block).

In this embodiment, the partial image used for calculating the histogram by the motion compensation unit 202 has the same size as the block. The size independent from the block size may be easily used. The partial image size gives a great influence on the shimmer correction performance. It is necessary to set the partial image size to be sufficiently larger than the width of the normal shimmer (twice the dispersion of scalarized displacement) while being made as small as possible so as to allow the histogram result to be hardly influenced compared with the shimmer, and reduction in the spatial resolution to be minimized. Preferably, the partial image size is adaptively controlled based on the shimmer width in the practical scene. Meanwhile, the block size is required to be substantially equal to or smaller than the moving object upon motion compensation. The respective configurations of the partial image and the block for calculating the histogram may be formed into square.

Instead of direct measurement of the shimmer width, the adaptive control may be realized by estimating whether the current partial image size is excessively larger or smaller than the shimmer width. For example, the cost value $C_{coarse}$ (hereinafter referred to as SAD: Sum of Absolute Difference) calculated by the approximate motion compensation unit 202a and the cost value $C_{fine}$ (hereinafter referred to as DHIST: Dissimilarity of HISTograms) calculated by the pixel accuracy motion compensation unit 202b are compared with respect to the common partial image (block) to make a determination by applying rules 1 to 4 sequentially. It is assumed that the scale of both values is already adjusted for easy comparison.

1. If both SAD and DHIST are smaller than the threshold value, the shimmer is not generated. Therefore, correction is stopped.
2. If both the SAD and the DHIST exceed the threshold value, the partial image is small to the shimmer (or failure in the motion compensation). Therefore, the partial image is enlarged to make the determination again.
3. If SAD<DHIST, the shimmer exists, and the partial image is too small. Therefore, the partial image is enlarged.
4. If SAD>DHIST, the shimmer exists, indicating that the partial image size is appropriate or excessively large.

It is not possible to determine whether the partial image size is appropriate or excessively large by applying only the rule 4. Therefore, an attempt is made to reduce the partial image size upon application of the rule 4. In the case where the rule 3 applies, it is determined that the partial image size derived when the rule 4 applies at the most recent timing has been optimum. The code SAD may be set to $C_{coarse}(0,0)$ with no motion compensation besides the $C_{coarse}$ with motion compensation.

In this way, means for evaluating the partial image size is capable of omitting all the process steps for correcting the partial region with no shimmer.

Second Embodiment

According to the first embodiment, the input image is retained for time smoothing. In this case, a large number of images have to be retained for the purpose of improving the shimmer correction effect, causing the problem of high storage cost. Furthermore, as the motion compensation has to be executed for a plurality of correction images, each process for the single image is required to be simplified. This embodiment presents the example for reducing the storage cost by the use of the corrected image as the correction image for the next image.

FIG. 4 shows an image processing device 40 according to the embodiment. In this embodiment, after application of object recognition to a correction-targeted image 41, the resultant image is divided into a plurality of regions. The motion compensation is executed for each region, and then the shimmer correction is executed. The image processing device 40 according to the embodiment includes an image memory 401, a motion compensation unit 402, a shimmer correction unit 403, and an image quality boosting unit 404.

The image memory 401 stores a single corrected image 407 so as to be output as a correction image 405 for a next image. The motion compensation unit 402 receives inputs of the correction-targeted image 41 and the correction image 405 to output a motion compensated correction image 406. The shimmer correction unit 403 receives inputs of the correction-targeted image 41 and the motion compensated correction image 406 so as to output a corrected image 407. The image quality boosting unit 404 receives an input of the corrected image 407 to output the output image 42.

The process executed for each region will be described in detail.

The image memory 401 stores the corrected image 407 so as to be output as the correction image 405 to the motion compensation unit 402 upon correction process to the next correction-targeted image 41.

The motion compensation unit 402 applies the object recognition technique to the correction-targeted image 41 as the latest input image so that the image is divided into a plurality of regions. The simplest way to divide the image is to execute the process for separating the moving object from background through the background difference method, the frame difference method and the like. The correction image 405 may be used as it is as the reference background. The representative motion model for the regions is obtained and corrected. At this time, data of the past division result do not have to be stored. It is also possible to express the motion model using the linear transformation parameter represented by not only the parallel displacement but also the affine transformation. The method of searching the parameter is similar to the known template matching. It is possible to obtain the parallel displacement parameters and the affine transformation parameter in sequence, and to further execute the iterative operation. Likewise the first embodiment, the sum of difference absolute values of pixel values of the (formula 1) and the difference in the histogram of the (formula 2) are used as evaluation functions so as to realize the two-stage search. If the size of the region is changed through reduction and magnification, the comparison maybe made after normalizing the total of the histogram frequency values. The motion compensation unit 402 applies the motion compensation process to the correction image 405 using the representative motion model obtained for each divided region, and outputs the motion compensated correction image 406 to the shimmer correction unit 403. The motion compensation is not necessary for the divided region which is positively determined as the immobile background.

The shimmer correction unit 403 receives inputs of the correction-targeted image 41 and the motion compensated correction image 406 for each divided region. The shimmer correction unit 403 then calculates similarity (reliability) by pixel between the correction-targeted image 41 and the motion compensated correction image 406. The corrected image 407 derived from mixing those two images in accordance with the similarity is output to the image quality boosting unit 404 and the image memory 401.

The method for calculating the similarity between two images by pixel has been disclosed in the earlier application as described above. According to the application, the similarity of the target pixel is defined as the one between the histogram of the pixel block including the target pixel at the center, and the histogram of the pixel block at the same position in the other image. Alternatively, each histogram for the pixel blocks at arbitrary positions of both images may be preliminarily obtained so that similarity of the target pixel is defined by the sum of the histogram similarity values derived from comparing all the pixel blocks including the target pixel between the values at the same positions. The histogram difference derived from the (formula 2) corresponds to the inverse number of the similarity as defined herein.

After calculating the similarity by pixel through the aforementioned method, the pixel values are mixed as expressed by a (formula 5) so as to be output.

$$p_{cor}(x,y) = \beta(x,y) \cdot p_{obj}(x,y) + (1-\beta(x,y)) p_{com}(x,y) \quad \text{(formula 5)}$$

The code $p_{cor}(x,y)$ denotes the pixel value of the corrected image 407 at coordinates (x,y), $p_{obj}(x,y)$ denotes the pixel value of the correction-targeted image 41 at coordinates (x,y), and $p_{com}(x,y)$ denotes the pixel value of the motion compensated correction image 406 at coordinates (x,y). The code Beta(x,y) denotes the coefficient from 0 to 1, which represents the mixture ratio at coordinates (x,y). The coefficient value approaches 1 as reliability of the motion compensated correction image 406 becomes lower. The code Beta(x,y) is obtained through the following (formula 6) using two threshold values $T_1, T_2 (T_1 < T_2)$, for example.

$$\beta(x, y) = \begin{cases} 1/S & \ldots & (c(x, y) < T_1) \\ 1/S + \dfrac{(S-1)(c(x,y) - T_1)}{S(T_2 - T_1)} & \ldots & (T_1 \le c(x, y) < T_2) \\ 1 & \ldots & (T_2 < c(x, y)) \end{cases} \quad \text{(formula 6)}$$

The code c(x,y) denotes the inverse number of similarity (that is, histogram difference) at coordinates (x,y), and the code S denotes the mixture parameter (1<S) that defines the lower limit of the updating rate of the corrected image. In other words, the correction-targeted image is reflected on the corrected image constantly at a rate of 1/S or higher. In the case where S=1, the pixel of the corrected image 407 is completely refreshed. The code S is empirically determined in accordance with the motion speed of the moving object, the speed of possible motion (shake of camera) that uniformly occurs over the entire image and the like.

Third Embodiment

According to the first and the second embodiments, the time smoothing is executed by the use of adaptive weight (including 0) based on the similarity by pixel of the motion compensated correction image.

In the earlier application, the time smoothed image is generated by simply time smoothing the correction-targeted image to calculate similarity between the correction-targeted image and the time smoothed image by pixel. The shimmer correction is executed by integrating the correction-targeted image and the time smoothed image in accordance with the calculated similarity.

In the related invention as described above (Patent Application No. 2013-57774), the similarity between the correction-targeted image and a plurality of correction images is obtained by pixel to determine whether or not the image is to be time smoothed, or with respect to intensity of smoothing for each pixel.

The device according to the second embodiment and the earlier application may be produced at the lower storage cost. However, when making an effort to provide the higher correction effect, it is likely to degrade quality of the correction image. In order to ensure high correction effect, the time smoothing has to be executed using the frames as many as possible. However, there is a limitation in the motion compensation of the moving object which varies its appearance as it moves. The image quality, therefore, is significantly influenced by the smear owing to the compensation error. In the case where the video image constantly contains a large number of moving subjects, it is impossible to provide the correction effect in spite of prolonged time for smoothing.

The device as related invention provides the image with better quality than the one derived from a plurality of prior arts 1. However, the similarity calculation process is required by the number of times corresponding to the correction images as the correction-targeted image is advanced by frame, resulting in the problem of markedly increased operation amount.

The embodiment proposes the method of realizing the effect which approximates the one of the structures as the related invention while suppressing the computation amount.

Figure 6:
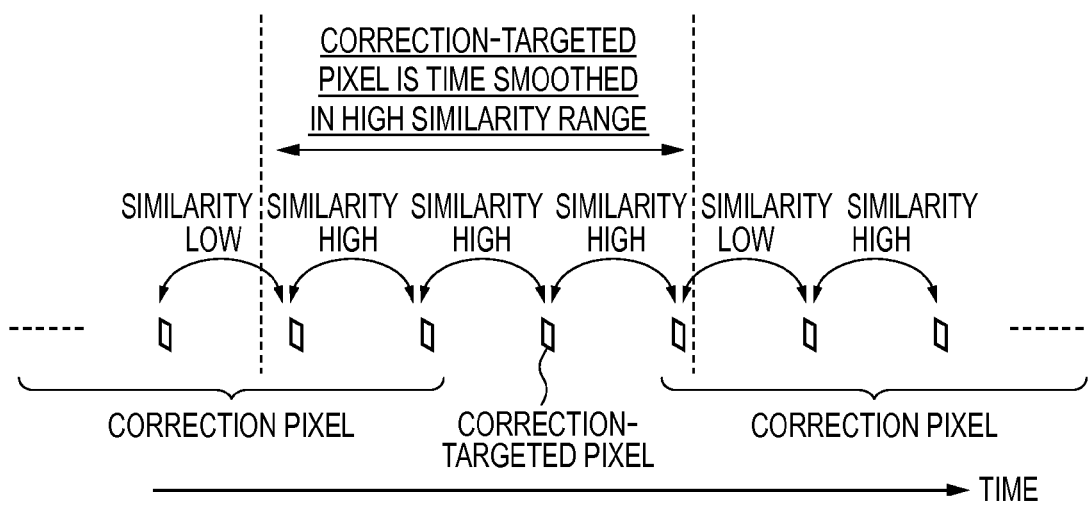
FIG. 6 is a conceptual view of similarity calculation performed by an image processing device according to a third embodiment of the present invention.

FIG. 6 is a conceptual view representing the similarity calculation performed by the image processing device according to the third embodiment. In this embodiment, similarity between one input image and the preceding image in time is only calculated, and stored in the memory together with the images. The method of calculating similarity may be similar to the one described in the first or the second embodiment. In reference to the similarity stored in the memory, the time smoothing is executed using only the pixel in the range determined as having high similarity in succession from the correction-targeted image. Specifically, the deduction reasoning is repeatedly made that "if there is similarity between the images A and B, and between the images B and C, similarity exists between the images A and C" from the correction-targeted image so as to find the group of images similar to each other.

At this time, the determination whether the similarity is high or low is made by setting the appropriate threshold value with respect to the calculated similarity. The similarity may be expressed by the single bit of high/low on the assumption of fixed threshold value. Alternatively, the similarity value may be stored as it is so as to ensure determination by changing the threshold value in accordance with the time relationship between the image subjected to the similarity calculation and the correction-targeted image.

Figure 7:
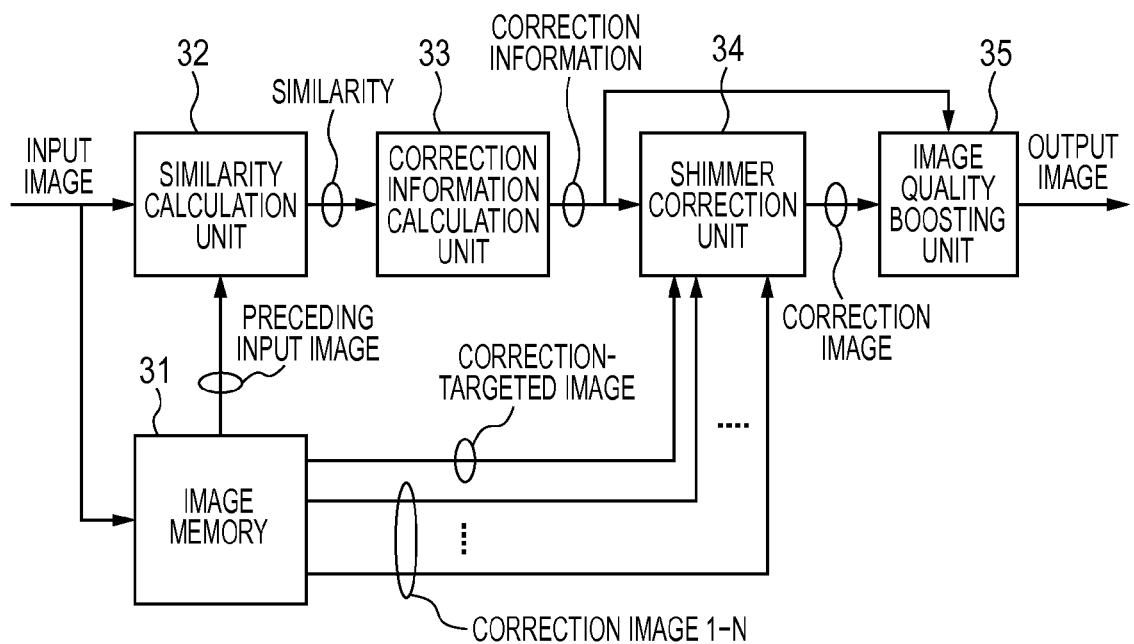
FIG. 7 is a block diagram of the image processing device according to the third embodiment.

FIG. 7 is a block diagram of the image processing device according to the third embodiment. The image processing device of this embodiment includes an image memory 31, a similarity calculation unit 32, a correction information calculation unit 33, a shimmer correction unit 34, and an image quality boosting unit 35, and receives an input of a time-series image as the input image.

The image memory 31 retains 1+N input images or more, and outputs the preceding input image to the similarity calculation unit 32. The memory also outputs the correction-targeted image to be subjected to the shimmer correction, and the correction images (1 ... N) temporally proximate to the correction-targeted image to the shimmer correction unit 34.

The similarity calculation unit 32 receives inputs of two images, namely the input image and the preceding frame, and outputs the similarity between those two images by pixel. The calculated similarity is required to be immune to the influence of the pixel movement owing to shimmer, but respond to the pixel movement of the moving subject. Likewise the first and the second embodiments, it is possible to use the similarity calculation method through comparison among histograms by block.

The correction information calculation unit 33 receives an input of similarity derived from the similarity calculation unit 32 to retain N frames of information and outputs the correction information for the correction-targeted image. The similarity to be retained may be subjected to the process using the threshold value and quantization in accordance with the required accuracy so as to further ensure reduction in the storage cost. For example, it is assumed that the similarity is expressed as the integer from 0 to M, and two threshold values $T_A, T_B (T_A < T_B)$ are set with respect to the calculated value. If the calculated value is equal to or smaller than $T_A$, the similarity becomes 0. If it is larger than $T_B$, the similarity becomes M. The values between 0 and M are quantized so as to be expressed from 1 to M-1. They are stored in the form of a similarity map where those values are arranged corresponding to the pixel of the newer one of two images which have been compared for obtaining the similarity. The correction information calculation unit 33 calculates the correction information based on the similarity map (1 ... N) retained therein. The correction information represents the ratio, for example, between the correction-targeted pixel in the correction-targeted image and the correction pixels (1 ... N) that exist on the same coordinates as the correction-targeted pixel in the correction images (1 ... N).

The shimmer correction unit 34 executes time smoothing of the correction-targeted image and the correction image based on the input correction information, and outputs the resultant image as the corrected image.

The correction information output from the correction information calculation unit 33 is set as the coefficient indicating the mixture ratio upon generation of the corrected image by smoothing the correction-targeted image and the correction images 1 to N. A (formula 7) represents the method of calculating the correction information at the position of the correction-targeted image at coordinates (x,y) at the time t.

$$a(t, n, x, y) = \begin{cases} \prod_{l=-n}^{1} (c(t+1-l, x, y)/M) & \dots n < 0 \\ 1 & \dots n = 0 \\ \prod_{l=1}^{n} (c(t+l, x, y)/M) & \dots n > 0 \end{cases} \quad \text{(formula 7)}$$

On the assumption that the frame at the time t is set as the correction-targeted image, the code a(t,n,x,y) denotes the mixture ratio (weight) of the pixel of the frame at coordinates (x,y) at the time t+n. The code c(t,x,y) denotes similarity between the image input at the time t and the image input at the time t-1 at coordinates (x,y). The code M denotes the maximum value of similarity.

The shimmer correction unit 34 executes the time smoothing process as expressed by a (formula 8) based on the correction information.

$$p_c(t, x, y) = \frac{\sum_{n=N'_2}^{N'_1} (p(t+n, x, y) \cdot a(t, n, x, y))}{\sum_{n=N'_2}^{N'_1} a(t, n, x, y)} \quad \text{(formula 8)}$$

The code $p_c(t,x,y)$ denotes the pixel value of the corrected image at coordinates (x,y), corresponding to the correction-targeted image as the input image at the time t (t: integer), and code p(t,x,y) denotes the pixel value of the input image at coordinates (x,y) at the time t.

The image quality boosting unit 35 receives inputs of the correction information and the corrected image, and outputs the corrected image that has been subjected to the image quality boosting process in the spatial domain. The image quality boosting process in the spatial domain may be executed with the single image, for example, the edge enhancement filter. Likewise the first embodiment, execution of the edge enhancement to the insufficiently smoothed image may cause the risk of enhancing influence of shimmer. This embodiment is configured to solve such problem by switching the filter strength locally in accordance with the correction information. For example, if both values of a (t, n+3, x, y) and a (t, n−2, x, y) are equal to or smaller than the constant value, the filter with high strength is selected. If those values are further smaller, the filter with low strength is selected. The frame with the ratio a to be referred to, and the threshold value will be appropriately adjusted.

Fourth Embodiment

According to the third embodiment, all the correction images used for correction are retained in the device, which requires the readout operation, leading to the storage cost that remains high.

Figure 8:
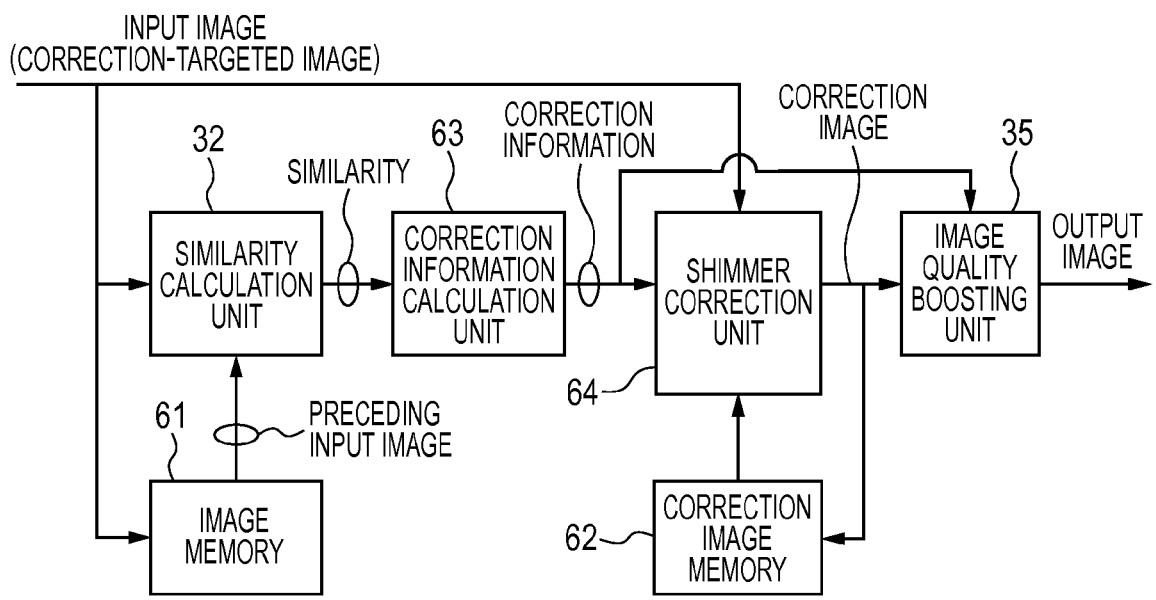
FIG. 8 is a block diagram of an image processing device according to a fourth embodiment of the present invention.

FIG. 8 is a block diagram of the image processing device according to the fourth embodiment. The image processing device of this embodiment includes the similarity calculation unit 32, an image memory 61, a correction image memory 62, a similarity memory 63, a shimmer correction unit 64, and the image quality boosting unit 35. The similarity calculation unit 32 and the image quality boosting unit 35 are the same as those described in the third embodiment. This embodiment is advantageous in significantly small frame delay in the time period between input and output as the latest input image becomes the correction-targeted image. The embodiment is further characterized in that the single piece of generated corrected image is stored in the memory in place of a plurality of the correction images so as to be used for generating the subsequent corrected image.

The image memory 61 retains the single frame of the input image, which is output as the preceding input image.

The correction information calculation unit 63 includes the same map as the similarity map of the third embodiment, and retains at least one of the number of continuous corrections indicating the number of frames subjected to the continuous shimmer correction counted from the present and the similarity (or correction information) among past N frames. Based on the retained information, the correction information is calculated. The number of continuous corrections may be easily obtained by receiving the signal of either 0 or 1 as a result of threshold processing from the similarity calculation unit 32. If the signal of 1 is received, the retained number will be incremented. If the signal of 0 is received, the retained number is returned to 0.

The simplest correction information may be the number of continuous corrections. It may also be said that the correction information indicates the number of past frames referred to correct the present correction-targeted image.

The shimmer correction unit 64 mixes the correction-targeted image and the preceding correction image as expressed by a (formula 9) based on the correction information from the correction information calculation unit 63, and outputs the resultant image.

$$p_c(t, x, y) = \begin{cases} p(t, x, y) & \dots \beta(t, x, y) = 0 \\ \dfrac{p(t, x, y) + \beta(t, x, y) \cdot p_c(t, x, y)}{1 + \beta(t, x, y)} & \dots \beta(t, x, y) \le N \end{cases} \quad \text{(formula 9)}$$

In the formula, the ratio of the corrected image becomes large as the number of continuous corrections increases. The constant ratio will provide the index moving average so that the influence of the old input image is weakened. On the contrary, the correction information according to the embodiment provides the same one as the accumulated moving average with constant weight irrespective of the old input image. This makes it possible to provide the similar correction effect to the one derived from the third embodiment.

According to the third embodiment, the specific gravity is adaptively changed in accordance with the similarity. This applies to the present embodiment by using the correction information on which the similarity is reflected as expressed by a (formula 10).

$$\beta(t, x, y) = \sum_{n=1}^{N} \left( \prod_{m=1}^{n} c(t+1-l, x, y) \right) \quad \text{(formula 3)}$$

The code Beta(t,x,y) denotes the mixture ratio of the image with respect to the correction image of the preceding frame upon correction of the position of the frame coordinates (x,y) at the time t. The correction information represents the ratio of smoothing of the correction-targeted pixel in the correction-targeted image with respect to the correction pixels from 1 to N that exist in the correction images from 1 to N on the same coordinates as those of the correction-targeted image.

The image quality boosting unit 35 executes the image quality boosting process to the corrected image in accordance with the correction information. For example, the process applied to the pixel will be switched depending on the value of Beta(t,x,y).

According to the embodiment, two images, namely the input image and the correction image are only retained to allow the pixel value of the correction-targeted image at coordinates (x,y) to be time smoothed using the pixel values in the past frames at coordinates (x,y) in which the moving subject does not exist.

Industrial Availability

The present invention may be widely applied to cope with distortion of the image which varies with time, for example, shimmering water surface, shivering of tree, mist in the atmosphere, and underwater photograph in addition to the heat haze. It may be applied to the device and the general method which may involve the sequence of data derived from imaging the strength distribution of electromagnetic wave and particle beam.

LIST OF REFERENCE SIGNS 11, 13: input image, 12: input image (correction-targeted image), 14,15: image, 16: correction image, 17: subject (tree), 171 to 173: image of subject 17 influenced by shimmer, 18: subject (pillar), 181 to 183: image of subject 18 influenced by shimmer, 19: subject (traveling vehicle), 191 to 193: image of subject 19 influenced by shimmer, 194, 195: motion compensated image of subject 19, 20: image processing device, 21: input image, 22: output image, 201: image memory, 202: motion compensation unit, 203: shimmer correction unit, 204: image quality boosting unit, 205: correction-targeted block, 206: correction image, 207: approximate motion vector (approximate motion information), 208: correction block, 209: cost value, 210: correction information, 211: correction block, 202a: approximate motion compensation unit, 202b: pixel accuracy motion compensation unit, 40: image processing device, 41: correction-targeted image, 42: output image, 401: image memory, 402: motion compensation unit, 403: shimmer correction unit, 404: image quality boosting unit, 405: correction image, 406: motion compensated correction image, 407: corrected image, 54: image, 554: corrected image of subject 17, 564: corrected image of subject 18, 58: region where the moving object 57 exists

The invention claimed is:

1. An image processing device for correcting a local shimmer of an input image, comprising:
    a motion compensation unit configured to acquire motion information of a moving object using a correction image temporally proximate to a correction-targeted image in the input image to output a motion compensated correction image using the motion information; and
    a shimmer correction unit configured to execute a time smoothing process using the correction-targeted image and the motion compensated correction image to output a corrected image with corrected shimmer of the moving object, wherein the motion compensation unit includes an approximate motion compensation unit for acquiring approximate motion information by aligning the correction-targeted image and the correction image, both of which have been reduced, and a pixel accuracy motion compensation unit for executing the motion compensation with at least the pixel accuracy using the correction-targeted image and the correction image, while taking the approximate motion information as an initial value.

2. The image processing device according to claim 1, comprising:
a storage unit for storing the corrected image output from the shimmer correction unit, wherein the motion compensation unit acquires the motion information of the moving object using the corrected image output from the storage unit as the correction image to output the motion compensated correction image.

3. The image processing device according to claim 1, wherein
the approximate motion compensation unit reduces the correction-targeted image and the correction image after low-pass filtering for alignment; and
wherein the pixel accuracy motion compensation unit acquires a histogram concerning a pixel value in each partial region of the correction-targeted image and the correction image, and searches a position of the partial region where similarity between the histograms becomes high so that the motion information of the moving object is obtained with at least the pixel accuracy.

4. The image processing device according to claim 3, wherein the shimmer correction unit changes a weight applied to the corresponding motion compensated correction image in accordance with the similarity calculated upon acquisition of the motion information used by the pixel accuracy motion compensation unit for motion compensation.

5. The image processing device according to claim 3, wherein the motion compensation unit and the shimmer correction unit are configured to process each block with a predetermined size as a unit, which is derived from dividing the correction-targeted image.

6. The image processing device according to claim 2, wherein the motion compensation unit divides the image into a plurality of regions by subjecting the correction-targeted image to an object recognition process, and acquires a motion model allowed to magnify and reduce the region for application of affine transformation.

7. The image processing device according to claim 1, further comprising:
a storage unit that stores the corrected image output from the shimmer correction unit,
wherein the motion compensation unit acquires motion information of a moving object using only the corrected image output from the storage unit as the correction image to output the motion compensated correction image;
wherein the shimmer correction unit calculates a similarity between the motion compensated correction image and the correction-targeted image by pixel, and mixes the motion compensated correction image and the correction-targeted image in accordance with the similarity so as to be set as the corrected image, and
wherein the similarity by pixel is represented by the similarity between a histogram of a pixel block including the pixel at the center and a histogram of the pixel block at the same position in another image, or the similarity of a target pixel is represented by a total of similarity values of the histograms acquired for pixel blocks of both the images at arbitrary positions, obtained by comparing all the pixel blocks including the pixels of both the images at the same position.

8. The image processing device according to claim 4, wherein the motion compensation unit and the shimmer correction unit are configured to process each block with a predetermined size as a unit, which is derived from dividing the correction-targeted image.

\* \* \* \* \*